(12) United States Patent
Dejaune et al.

(10) Patent No.: US 10,195,680 B2
(45) Date of Patent: Feb. 5, 2019

(54) SHAFT MACHINING ANTI-VIBRATION DEVICE

(71) Applicant: SAFRAN AIRCRAFT ENGINES, Paris (FR)

(72) Inventors: Claude Dejaune, Boissise la Bertrand (FR); Cyril Douady, Bondoufle (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 31 days.

(21) Appl. No.: 15/303,124

(22) PCT Filed: Apr. 8, 2015

(86) PCT No.: PCT/FR2015/050906
§ 371 (c)(1),
(2) Date: Oct. 10, 2016

(87) PCT Pub. No.: WO2015/155469
PCT Pub. Date: Oct. 15, 2015

(65) Prior Publication Data
US 2017/0028489 A1   Feb. 2, 2017

(30) Foreign Application Priority Data

Apr. 8, 2014 (FR) ..................................... 14 53079

(51) Int. Cl.
*B23B 29/02* (2006.01)
*B23B 41/02* (2006.01)
(Continued)

(52) U.S. Cl.
CPC ............ *B23D 77/003* (2013.01); *B23B 41/02* (2013.01); *B23B 49/02* (2013.01); *B23D 77/006* (2013.01);
(Continued)

(58) Field of Classification Search
CPC ..... B23B 41/02; B23B 29/022; B23B 27/002; B23B 49/02; B23D 77/003;
(Continued)

(56) References Cited

U.S. PATENT DOCUMENTS 1,281,420 A * 10/1918 Reid ................... B23B 51/0486
29/DIG. 68
2,283,497 A    5/1942 Fields et al.
(Continued)

FOREIGN PATENT DOCUMENTS

AT    251373 B  * 12/1966 ......... B23B 51/0486
CH    446 855 A    11/1967
(Continued)

OTHER PUBLICATIONS

International Search Report as issued in International Patent Application No. PCT/FR2015/050906, dated Jul. 17, 2015.

*Primary Examiner* — Ryan Rufo
(74) *Attorney, Agent, or Firm* — Pillsbury Winthrop Shaw Pittman LLP

(57) ABSTRACT

An anti-vibration device for the machining of a shaft includes a first fixed ring intended to be kept inside a shaft by a shoulder, the anti-vibration device including: at least one first external groove and at least one first external seal for forming at least one contact with the internal surface of the shaft; at least one first internal circumferential groove and at least one first internal seal for forming at least one contact with the external surface of the bar; an internal circumferential cavity that is able to cause the circulation of a fluid arriving through a first duct and leaving through a second duct, the first duct and second duct passing through the radial thickness of the anti-vibration device, the internal circumferential cavity making it possible to realize a vibration-damping function when a fluid passes through it.

9 Claims, 2 Drawing Sheets

(51) Int. Cl.
*B23D 77/00* (2006.01)
*B23B 49/02* (2006.01)
*F16F 15/023* (2006.01)
*F16F 15/08* (2006.01)
*F16F 15/02* (2006.01)
*B23B 27/00* (2006.01)

(52) U.S. Cl.
CPC .......... *F16F 15/022* (2013.01); *F16F 15/023* (2013.01); *F16F 15/0237* (2013.01); *F16F 15/08* (2013.01); *B23B 27/002* (2013.01); *B23B 29/022* (2013.01); *B23B 2250/12* (2013.01); *B23B 2250/16* (2013.01); *B23D 2277/10* (2013.01); *B23D 2277/60* (2013.01)

(58) Field of Classification Search
CPC ............. B23D 2277/10; Y10T 408/568; Y10T 408/5583; Y10T 408/558; Y10T 408/557
See application file for complete search history.

(56) References Cited

U.S. PATENT DOCUMENTS

| | | | | | |
|---|---|---|---|---|---|
| 2,507,204 | A | * | 5/1950 | Giern | B23B 49/023 408/241 R |
| 2,552,463 | A | * | 5/1951 | Searles | B23Q 11/10 285/190 |
| 2,744,269 | A | * | 5/1956 | Kerr | B23G 1/22 408/218 |
| 2,747,948 | A | * | 5/1956 | Jergens | F16C 33/78 384/482 |
| 3,014,384 | A | * | 12/1961 | Carlstedt | B23B 29/022 408/143 |
| 3,020,786 | A | * | 2/1962 | De Graffenried | B23B 41/02 33/543 |
| 3,051,059 | A | * | 8/1962 | Davey | B23B 5/162 408/82 |
| 3,071,030 | A | * | 1/1963 | Larry | B23B 49/023 408/72 B |
| 3,591,304 | A | * | 7/1971 | Galbarini | B23B 29/022 408/147 |
| 2001/0006123 | A1 | * | 7/2001 | Kleine | B23B 51/06 175/213 |
| 2008/0277886 | A1 | * | 11/2008 | Peter | B23B 31/001 279/60 |
| 2009/0123243 | A1 | * | 5/2009 | Nomura | B23B 41/02 408/1 R |
| 2012/0051861 | A1 | * | 3/2012 | Rimet | B23D 77/02 408/83 |

FOREIGN PATENT DOCUMENTS

| | | | |
|---|---|---|---|
| EP | 1 844 886 A1 | 10/2007 | |
| JP | 59-209709 A | * 11/1984 | ............ B23B 51/06 |
| WO | WO 0245892 A1 | * 6/2002 | ............ B23B 29/022 |

* cited by examiner

SHAFT MACHINING ANTI-VIBRATION DEVICE

CROSS REFERENCE TO RELATED APPLICATIONS

This application is the U.S. National Stage of PCT/FR2015/050906, filed Apr. 8, 2015, which in turn claims priority to French Patent Application No. 1453079 filed Apr. 8, 2014, the entire contents of all applications are incorporated herein by reference in their entireties.

BACKGROUND

Field of Invention

The field of the invention concerns machining devices and in particular those used for reaming, milling, boring and counter-boring of turbine shafts. The field of the invention relates to devices limiting the vibration induced during machining operations that comprise shaft reaming, milling, boring or counter-boring.

Description of Prior Art

At present, there exist different techniques permitting the reaming, boring and counter-boring of shafts. Such operations can be highly complex to master when the operation takes place on long shafts and must be carried out blind, i.e. without visibility of the operation carried out.

In particular, the tool permitting the machining must ensure the straightness of operation in order to guarantee a constant delta, i.e. to guarantee that the tolerances for the internal diameter of shafts is respected and without the presence of any undulations in order to respect dynamic operating criteria. Furthermore, it must ensure a machined diameter within a limited tolerance. In addition, the tool must guarantee balance and a regularity of the surface state obtained after machining.

Generally, for aircraft turbine-engine shafts, the orders of magnitude are a machined length of 2300 mm, with a delta of 0.01 mm and a straightness tolerance of 0.02 mm At the present time, this calibration operation is carried out on a boring machine by a bar equipped with a calibration head on its end.

One problem noted is that the smaller the diameter of the shaft to be machined, the more vibration increases during machining. The vibration phenomenon generated by this type of machining corresponds to a relative movement, that between the part being machined and the cutting tool, this translates into more or less marked undulations of the machined surface.

The smaller the diameter of the tool bearing bar, the greater the amplitude of vibration is likely to increases.

In the case of deep counter-boring, taking into account the relationship between diameter and length, the vibration phenomenon is difficult to resolve. Various solutions exist, including for example:
- the stiffening of the part using bezels in order to externally hold the shaft during rotary boring;
- the choice of cutting tools with an optimisation of their cutting angle, steel grade or coverings;
- an optimisation of the cutting parameters, such as rotation speed, the number of cutting edges, tool advance per rotation and an adjustment of the flowrate and pressure of the cutting fluid coolant.

But such solutions are not completely satisfactory since they do not totally suppress the appearance of vibration. Furthermore, they can be complex and difficult to implement.

SUMMARY OF THE INVENTION

The invention solves the above stated disadvantages.

One embodiment of the invention concerns an anti-vibration device for the calibration and machining of a hollow shaft, characterised in that in comprises a first element intended to be maintained at least partially within the interior of the shaft and in a fixed position relative to it, and permitting the guiding of a guide bar moving axially inside the shaft, the first element comprising:
- at least one first mechanical damping means disposed on the external periphery of the first element in relation to the internal surface of the shaft and making contact with it;
- at least one second mechanical damping means located in the interior of the periphery of the first element in relation to the external surface of the guide bar and making contact with it.

Advantageously, in addition, the first element comprises a hydraulic damping means via the intermediary of a body of lubricating fluid flowing through the first element.

Advantageously, the first element is a first collar held in a fixed position axially in relation to the shaft by means of a shoulder, the said anti-vibration device comprising:
- at least one external first groove and at least one first exterior seal adapted to cooperate in the first said exterior groove and forming the first means of damping;
- at least one first internal circumferential groove and at least one first internal seal adapted to cooperate in the first said internal groove and forming the second means of damping;
- an internal circumferential cavity suitably formed to circulate the fluid arriving by a first duct and exiting via a second duct, the first and second ducts traversing the radial thickness of the anti-vibration device, the internal circumferential cavity forming the hydraulic means when a fluid flows through the first element.

Advantageously, the first and second internal circumferential grooves respectively are located close to each of the extremities of the first collar.

Advantageously, the internal circumferential cavity extends longitudinally between:
- a first extremity in proximity to the first internal circumferential groove;
- a second extremity in proximity to the second internal circumferential groove.

Advantageously, the first duct comprises a first elbowed opening permitting the passage of a fluid from the exterior of the anti-vibration device to flow towards the internal circumferential cavity, the said first elbowed opening comprising a longitudinal opening the length of the external surface of the first collar and a radial prolongation leading into the internal circumferential cavity in proximity to the first extremity of the said cavity.

Advantageously, the second duct comprises a second elbowed opening permitting the passage of a fluid from the internal circumferential cavity towards the exterior of the anti-vibration device, the said second elbowed opening comprises a radial opening in proximity to the second extremity of the said cavity and a longitudinal prolongation traversing the shoulder so as to lead to the exterior of the said anti-vibration device.

Advantageously, the anti-vibration device comprises a second element intended to be maintained at least partially to the head of the machining head and in a fixed position in relation to it, the second element comprises at least one third means of mechanical damping on the external periphery of the second element in relation to the internal surface of the shaft and making contact with it.

Advantageously, the second element comprises an external groove and a second external seal adapted to cooperate with the said second external groove and forming the third means of mechanical damping.

Advantageously, the body of the first and/or second elements are made from polyamide.

Another purpose of the invention concerns a machining head intended for boring a shaft and comprising an ensemble of shoes, the said machining head being guided by a guide bar fixed to the machining head by an attachment, characterised by a moving collar that is solidly mounted on the said machining head, the said moving collar comprising an external groove and an external seal suited to cooperate with the said second exterior groove to form at least one contact with the internal surface of the shaft and permit part of the vibration generated during machining to be absorbed.

Advantageously, the attachment means is via a locking collar.

Advantageously, the moving collar is held fixed longitudinally at the periphery of the said machining head between an edge of the extremity of the said machining head and the locking ring.

Another purpose of the invention concerns an anti-vibration machining system comprising:
 a machining head of the invention and comprising an orifice permitting the entry of a lubrication fluid into the part of a shaft to bore;
 an anti-vibration device of the invention suited to the passage of a guide bar during the machining of a shaft.

BRIEF DESCRIPTION OF FIGURES

Other characteristics and advantages of the invention will become apparent on reading the following detailed description, and referring to the enclosed drawings, which illustrate.

DESCRIPTION

Figure 1:
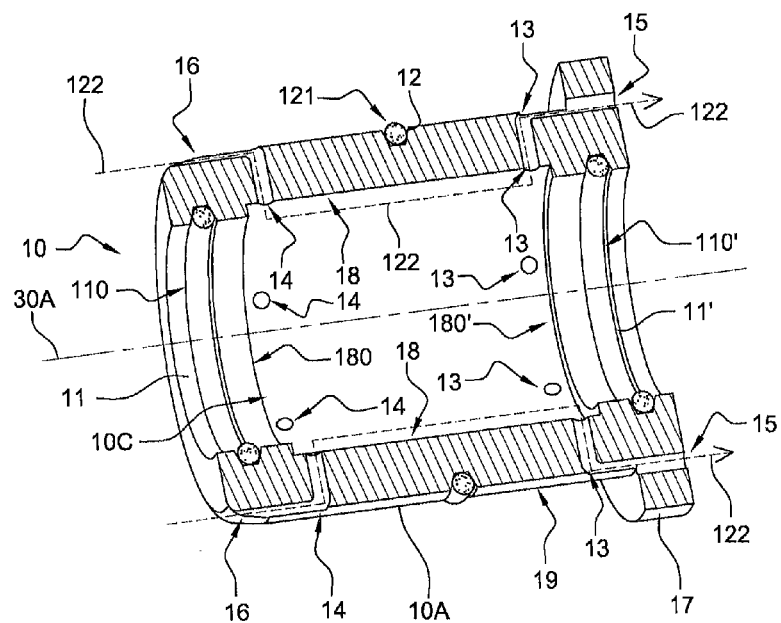
FIG. 1: a fixed collar of the invention comprising a cavity in which a fluid circulates.

FIG. 1 represents an anti-vibration device of the invention comprising a first element forming a fixed collar 10 intended to be secured to a hollow shaft 30 to be bored and lying along longitudinal axis 30A. The shaft 30 is shown in FIG. 3.

The fixed collar 10 has a body 10A lying along a longitudinal axis 10B and having a central opening 10C lying along the said axis and running through the body 10A. The latter is extended by a shoulder 17 on one of its extremities. The shoulder 17 permits the defining of a thrust surface between the fixed collar 10 and one extremity of the shaft to be bored 30. The shoulder 17 of fixed collar 10 thus permits the longitudinal maintaining of the fixed collar 10 in relation to the shaft 30.

The body 10A of the fixed collar 10 comprises one first external groove 12 and at least one external seal 121 adapted to cooperate with the first external groove 12 to form a circumferential contact with the internal surface of shaft 30 when the fixed collar 10 is mounted on the shaft 30.

Figure 3:
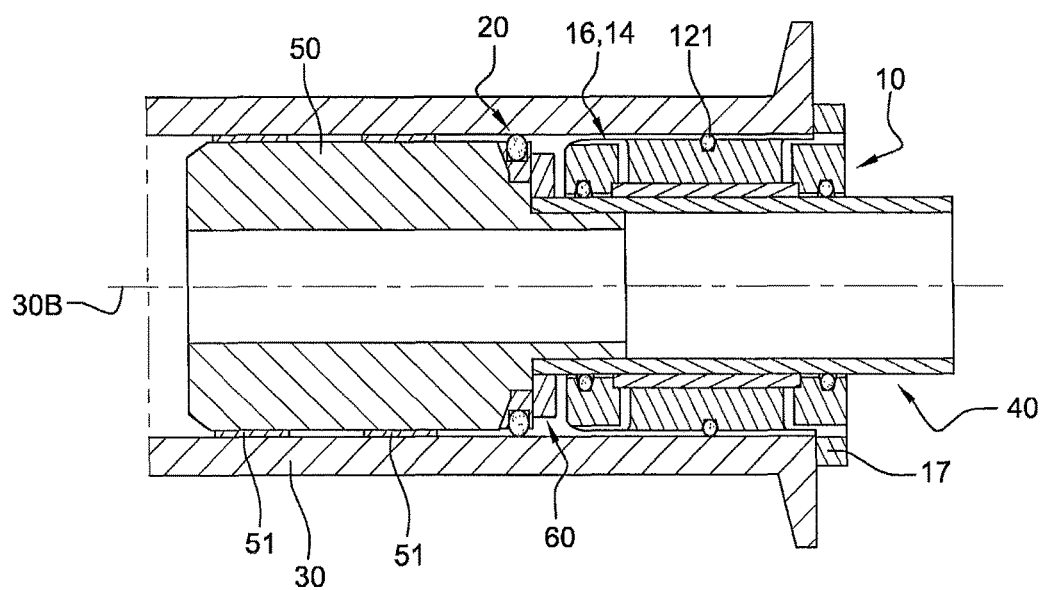
FIG. 3: an anti-vibration machining system inserted in a shaft to bore.

The fixed collar 10 equally comprises a first internal circumferential groove 11 and at least one first internal seal 110 adapted to cooperate to form a circumferential contact with the external surface of a guide bar 40 of a cutting tool such as machining head 50 shown in FIG. 3. This first groove 11 is located in proximity to one of the edges of the fixed collar 10, i.e. to one of its extremities, preferably opposite the shoulder 17.

The fixed collar 10 comprises a second internal circumferential groove 11' and at least one first internal seal 110' adapted to cooperate to form circumferential contact with the external surface of guide bar 40 of a cutting tool such as machining head 50. This second groove 11' is located in proximity to the other edge of fixed collar 10, i.e. at the opposite extremity to where the first circumferential groove 11 is found, preferably at the extremity of shoulder 17.

The seals 110 and 110' permit forming a contact with a guide shaft 40 and permits the limiting of leaks or the passage of fluid circulating in collar 10.

The opening 10C of fixed collar 10 furthermore comprises an internal circumferential cavity 18 able to circulate a fluid 122 arriving via a first duct 14, 16 and exiting via a second duct 13, 15.

The cavity 18 machined in collar 10 forms a circumferential bath. Because of this, the thickness of the collar over the length of the bath is less than its thickness at its extremities. Thus a certain volume of fluid can circulate in the fixed collar 10 over a given width.

The fluid passing through the collar can only flow through cavity 18 due to the presence:
 of internal seals 110, 110' stopping the flow of the fluid 122 through the principal opening 10C of the fixed collar 10 and;
 the external seal 121 stopping the flow of fluid on the external periphery of fixed collar 10 between shaft 30 and the fixed collar 10.

Preferably, the internal and external seals are of a material suited to resist water, oils and lubricants.

Fluid 122 is advantageously a lubrication fluid that can be introduced during machining and notably by the cutting tool that may comprise an opening permitting the injection of the lubricant.

Fixed collar 10 permits the return routing of lubricant 122 towards the exterior of shaft 30 while using its flow inside cavity 18 of the fixed collar 10 as a damper of the vibration generated by the machining operation.

To direct the lubricant 122 to the inside of the cavity 18, the fixed collar comprises openings 16, 14 on its extremity located inside shaft 30. The openings 16, 14 form elbow shaped ducts or lumen 16, 14.

FIG. 1 represents a cross-section of an elbow shaped groove 16, 14 in which a first longitudinal groove leads, on one hand, towards the extremity of the fixed collar 10 and, on the other, towards a radial groove 14 leading into cavity 18.

Thus the lubricant previously injected into the shaft to be bored via an opening (not shown) of the cutting tool 50 may exit by at least a first duct 14, 16 giving onto the hollow cavity 18 of the fixed collar 10 and forming a circumferential cavity 18.

The fixed collar 10 may comprise a plurality of inlets and outlets 16, 14 forming elbow shaped openings. FIG. 1 shows, for example, two radial openings in the section plane and two radial openings. It follows that in this example six radial grooves are present and extended with the same number of longitudinal grooves leading to the interior of the shaft.

The distribution of openings 16, 14 may be uniformly spread over the periphery of the fixed collar 10.

Thus the number of openings 14, 16 can be dimensioned in relation to the flowrate of the fluid to circulate in the cavity and therefore provide a degree of damping that diminishes vibration.

In one embodiment, the fixed collar 10 comprises second exit openings 13, 15 disposed symmetrically in relation to the first openings 16, 14 at the other extremity of the fixed collar 10, i.e. on the external side of the shafts. Their geometry may be substantially similar to openings 14, 16, i.e. having an elbow shape. The radial openings 13 forming lumens arranged on the periphery of the fixed collar 10 are extended by longitudinal openings 15 leading to the exterior of the fixed collar 10 from the external side of shaft 30. In another embodiment, the longitudinal openings 15 form lumens traversing shoulder 17 of the fixed collar 10.

The fluid 122 follows the path shown by the dotted lines in FIG. 1. The fluid 122 present in the interior of shaft 30 enters in the fixed collar 10 from the side of seal 110 and follows the elbow ducts 16, 14, then spreads throughout the circumferential cavity 18 and is then ejected via the intermediary of elbow ducts 13, 15.

The circumferential cavity 18 provides the function of a vibration damper when a fluid 22, such as a lubricant, passes through it. The fluid passing through the circumferential cavity 18 permits the generation of a fluid pressure that linked to its viscosity produces an additional hydraulic damping coefficient through the absorption of energy.

Figure 2:
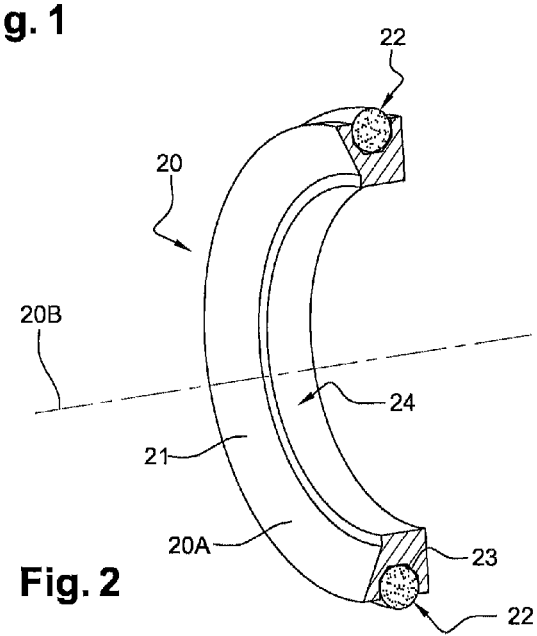
FIG. 2: a moveable collar of the invention intended to be attached to a machining head.

FIG. 2 represents a second element forming a moveable collar 20 intended to be attached to a mobile cutting tool such as machining head 50 shown in FIG. 3. The moveable collar 20 has an annular body 20A around axis 20B, and on its exterior periphery is a circumferential groove 23 adapted to receive a seal 22. The seal 22 is intended to create an area of contact between moveable collar 20 and the interior surface of the shaft to be bored or machined 30 so as to dampen part of the vibration generated while machining the shaft 30. The moveable collar 20 is arranged on the rear part of the machining head 50, i.e. on the part of head 50 the closest to junction with shaft 30. The rear part of the moveable collar 20 is the part furthest away from shaft 30 when the machining head 50 is inserted blind into shaft 30.

The moveable collar 20 is fixed to machining head 50. For this purpose, it may be held in place by a locking ring 60.

According to the embodiments, the moveable collar 20 may have various profiles, such as cylindrical annular profile or a chamfered profile so as to comprise a conical crown face resting on a circular and inclined face of machining head 50.

The lower peripheral face 24 of moveable collar 20 rests on an upper peripheral face of the machining head 50.

FIG. 3 represents an assembly with a machining head 50 comprising guide shoes 51 that are sleeved in hollow shaft 30 to bore with the aid of guide bar 40.

The guide bar is 40 firmly attached to machining head 50 by way of a locking ring 60. Locking ring 60 may have a double function:
  to firmly attach machining head 50 to the guide bar 40;
  to firmly attach the moveable collar 20 to the machining head 50.

Advantageously, guide bar 40 and machining head 50 comprise a means of introducing a fluid 122 such as a lubricant into shaft 30 to be machined. This lubricant may be evacuated via the fixed collar 10 as previously described. The flowrate of the injected lubricant may be adjusted according to the desired flowrate circulating in the circumferential cavity and in order to change the frequency response of the generated vibrations.

The fixed collar 10 may be mounted on guide bar 40 and introduced into shaft 30 at the same time as cutting tool 50 which is linked to the guide bar 40.

The fixed collar 10 and the moveable collar 20 may be made from polyamide. Furthermore, an ensemble formed by these two may be arranged before machining a shaft in such a way as to diminish the vibration generated by the machining of a long shaft. The arrangement of collar and ring may be simply carried out by selecting a fixed collar whose interior diameter is suited to the passage of a guide bar 40 and whose external diameter is suited to cooperate with the internal diameter of the shaft 30.

Similarly, the moveable collar 20 can be selected so as to cooperate with a given machining head 50. It can be specifically designed for a given machining head 50. In another embodiment, the moveable collar 20 may be associated with calibration collars permitting the creation of an additional thickness between machining head 50 and moveable collar 20. This permits, for example, to produce moveable collars 20 with a greater diameter in order to be compatible with a greater number of machining heads while remaining compatible through their correct functioning.

One advantage of the anti-vibration device of the invention and in particular of the fixed collar 10 is that it also has a guiding function for guide bar 40 in shaft 30. This guiding function allows greater rectilinear precision of guide bar 40 and therefore of the machining head 50 with the shaft to be bored 30.

The reduction of vibration obtained with the invention is the combination of the damping effects, on one hand, produced by seals 110, 110', 121 and 22 and on the other those produced by the fluid circulating in the cavity of the fixed collar 10. The combination of these two mechanical and hydraulic damping effects permits a better control of the frequency response of the vibration generated both via mechanical retention and the viscosity coefficient.

Moreover, the two damping effects permit the frequency response to be adapted to the vibration generated:
  on one hand, between guide bar 40 and fixed collar 10 and;
  on the other, between fixed collar 10 and the shaft 30 being bored, and moveable collar 20 and the shaft 30 being bored.

The reduction of vibration during reaming, milling and boring of shaft 30 permits obtaining a better surface state after the said operations, and this with long shaft 30 lengths. Notably, the invention is compatible with all shaft lengths to be bored. The results and improvements in the surface state are significant with long shafts, particularly those greater than 1800 mm and going up to shafts of 2300 mm to 2500 mm in length. The invention can be applied to all diameters for reaming, milling and boring, particularly those between 30 mm and 60 mm.

The invention claimed is:

1. An anti-vibration device for machining a hollow shaft, comprising a first element constructed and arranged to be maintained at least partially within the hollow shaft in a fixed position in relation to the hollow shaft and constructed and arranged to permit the guiding of a guide bar to move axially within the hollow shaft, the first element comprising:
  at least one first mechanical vibration damper at an external periphery of the first element in relation to an internal surface of the hollow shaft and in contact with the internal surface;

at least one second mechanical vibration damper arranged at an internal diameter surface of the first element in relation to an external surface of the guide bar and in contact with it the external surface;

an internal circumferential cavity configured to circulate a fluid arriving via a first duct and exiting via a second duct, the first and second ducts passing through a radial thickness between the external periphery of the first element and the internal diameter surface of the first element, the internal circumferential cavity forming a hydraulic damper when a pressurized lubricating fluid flows through the first element.

2. The anti-vibration device for machining a hollow shaft according to claim 1, wherein the first element is a first collar held fixed axially in relation to the hollow shaft by means of a shoulder, the anti-vibration device comprising:

at least one first external groove and at least one first external seal adapted to cooperate with the first external groove and forming the first mechanical vibration damper;

at least a first internal circumferential groove and at least one first internal seal adapted to cooperate with the first internal groove and forming the second mechanical vibration damper.

3. The anti-vibration device for machining a hollow shaft according to claim 2, wherein the first internal circumferential groove and a second internal circumferential groove are each located close to the extremities of the first collar.

4. The anti-vibration device for machining a hollow shaft according to claim 3, wherein the internal circumferential cavity extends longitudinally between:

a first extremity in proximity to the first internal circumferential groove;

a second extremity in proximity to the second internal circumferential groove.

5. The anti-vibration device for machining a hollow shaft according to claim 4, wherein the first duct comprises:

a first elbowed opening permitting the passage of a fluid from the exterior of the anti-vibration device towards the internal circumferential cavity, the first elbowed opening comprising a longitudinal opening extending along the exterior surface of the first collar and a radial extension leading into the internal circumferential cavity in proximity to the first extremity of the internal circumferential cavity.

6. The anti-vibration device for machining a hollow shaft according to claim 5, wherein the second duct comprises:

a second elbowed opening permitting the passage of a fluid from the internal circumferential cavity to the exterior of the anti-vibration device, the second elbowed opening comprising a radial opening in proximity to the second extremity of the internal circumferential cavity and a longitudinal prolongation passing through the shoulder so as to lead to the exterior of the anti-vibration device.

7. The anti-vibration device for the machining of a hollow shaft according to claim 1, further comprising a second element constructed and arranged to be maintained at least partially to an exterior of a machining head and in a fixed position in relation to the machining head, the second element comprising:

at least a third mechanical vibration damper arranged at an external periphery of the second element in relation to the internal surface of the hollow shaft and making contact with the hollow shaft.

8. The anti-vibration device for machining a hollow shaft according to claim 7, wherein the second element comprises an external groove and an external seal adapted to cooperate with the external groove of the second element and forming the third mechanical vibration damper.

9. The anti-vibration device for machining a hollow shaft according to claim 7, wherein bodies of the first and/or second element are made from polyamide.

* * * * *